INVENTOR.
VEE CHANG TSIEN
JOHN W. MEULENDYK
BY

ATTORNEY

United States Patent Office 3,311,123
Patented Mar. 28, 1967

3,311,123
ELECTROHYDRAULIC SERVO VALVE
Vee Chang Tsien and John W. Meulendyk, Kalamazoo, Mich., assignors, by mesne assignments, to Pneumo-Dynamics Corporation, Cleveland, Ohio, a corporation of Delaware
Filed Apr. 27, 1959, Ser. No. 809,271
1 Claim. (Cl. 137—85)

This invention relates to fluid controlled devices and more particularly to a new and improved electrohydraulic valve for controlling hydraulic systems.

Electronic development has progressed to a degree which permits accurate sensing of conditions and the production of accurately controlled electrical signals. In a power system controlled by electronic devices, however, it is often necessary to convert the control signal into a controlled hydraulic pressure differential. To convert the electrical signal accurately into hydraulic pressure differentials introduces many problems and the accuracy of the conversion is extremely important to the accuracy of the system. In a device according to this invention, electric signals are utilized to produce a controlled pressure differential in liquid under pressure wherein the response to signal variations is both rapid and accurate.

It is an important object of this invention to provide a hydraulic control device which is capable of accurately producing hydraulic pressure differentials in response to electric signals of a small magnitude.

It is another important object of this invention to provide a new and improved fluid controlled device which can be used to accurately operate fluid motors or the like in response to electric signals.

It is still another object of this invention to provide an electrohydraulic servo valve which produces hydraulic pressure differentials which are a direct function of an electrical signal applied to the valve.

It is still another object of this invention to provide an electrohydraulic servo valve wherein the electrical force applied to a torque motor is directly balanced by the controlled output pressure of the valve.

Further objects and advantages will appear from the following description and drawings, wherein.

Figure 1:
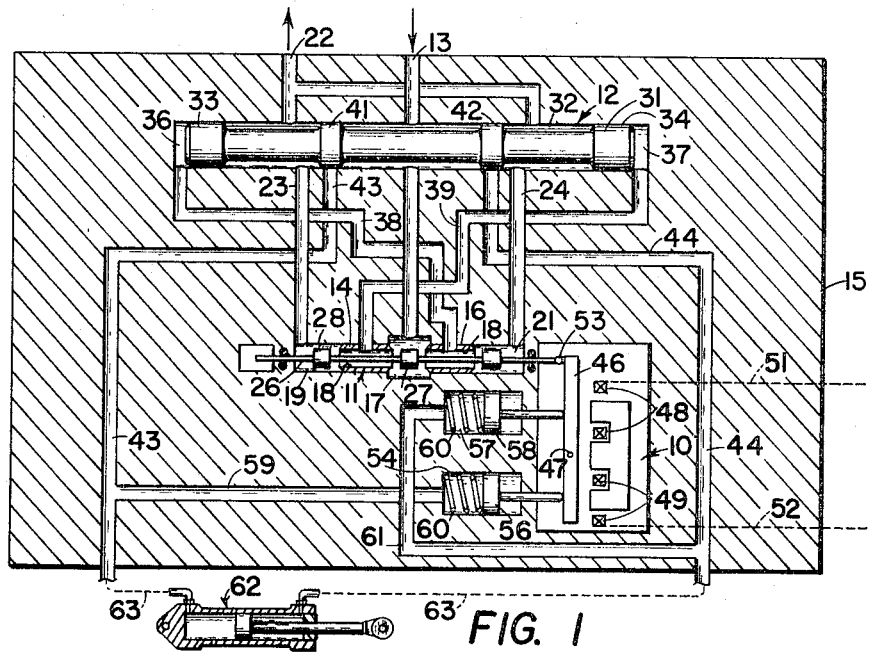
FIGURE 1 is a schematic view of a preferred valve according to this invention illustrating the positions the elements assume when there is no signal applied.

A servo valve according to this invention is particularly adapted for use in controlling the operation of fluid force motors or the like in response to electronic signals. In such a device, the controlled pressure from the valve can be applied to a simple piston and cylinder type actuator. Since the pressure differential produced by the valve is a direct function of an electric signal applied to the valve, the pressure differential across the piston is a direct function of the signal and in turn the force produced by the actuator is directly related to the signal.

Referring to the drawings, the valve includes a first stage pilot valve 11 operated by a torque motor 10 and a power valve 12 operated by the pilot valve 11.

In the illustrated embodiment, the entire device is a unitary system having a body 15 in which all the elements are located. Hydraulic pressure from a source such as a pump or the like is connected to an inlet passage 13 which is open to the center of both the power valve 12 and the pilot valve 11. The pilot valve 11 is provided with two orifice sleeves 14 and 16 on either side of a central chamber 17 to which the inlet passage 13 connects. Each of the orifice sleeves 14 and 16 are formed with a through bore 18 open at one end of the central chamber 17 and at the other end to end chambers 19 and 21 respectively. The end chambers 19 and 21 are each connected to a reservoir return 22 through return passages 23 and 24 respectively. Extending through both of the orifice sleeves 14 and 16 is a balanced pilot valve plunger 26. The pilot valve plunger 26 is guided in the body of the valve for axial movement in either direction from the neutral position shown in FIGURE 1. A central land 27 is mounted on the pilot valve plunger 26 within the central chamber 17 between the two orifice sleeves 14 and 16. Similarly, end lands 28 and 29 are mounted on the plunger 26 in the end chambers 19 and 21 respectively adjacent to the ends of the associated orifice sleeves 14 and 16. When the plunger 26 is in neutral position of FIGURE 1, the central land 27 is equally spaced from the inner ends of the orifice sleeves 14 and 16 and the end lands 28 and 29 are equally spaced from the outer ends of the associated orifice sleeves 14 and 16. Therefore, liquid under pressure flowing into the central chamber 17 is divided and flows equally through the orifice sleeves 14 and 16 to the reservoir return 22. The proportions are normally arranged so that there is equal resistance to flow into and out of the bores 18 so that the pressure in the bores will be one-half of the pressure of the inlet assuming that the pressure of the reservoir return 22 is substantially zero. The proportions illustrated have been enlarged for purposes of clarity and very small clearances are provided so that a relatively small rate of flow will be provided through the pilot valve 11.

Figure 3:
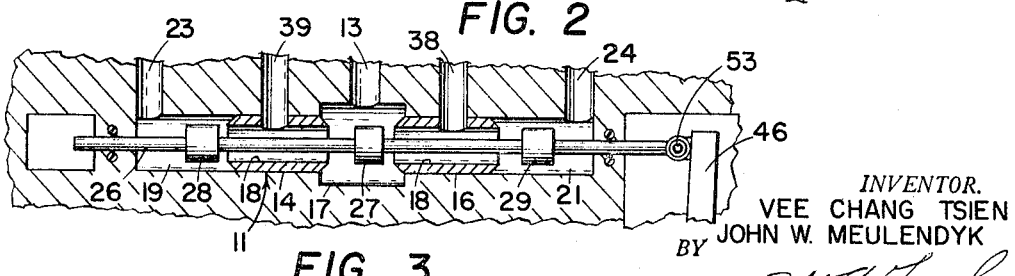
FIGURE 3 is an enlarged fragmentary view of the pilot valve showing the pressure distribution as liquid flows therethrough when this valve is operated.

If the pilot valve 11 is shifted to the right from the neutral position to the position shown in FIGURE 3, the central land 27 tends to close off the path of flow into the orifice sleeve 16 and increase the size of the path to the orifice sleeve 14. This increases the pressure drop of the flow into the orifice sleeve 16 and decreases the pressure drop into the orifice sleeve 14. At the same time, the movement of the plunger 26 to the right moves the end land 29 away from the orifice sleeve 16 to decrease the flow resistance out of the orifice sleeve 16 so that the pressure within the bore 18 of the orifice sleeve 16 drops. The same movement of the plunger 26 moves the end land 28 to the right and restricts the flow out of the bore 18 of the orifice sleeve 14 so there is a pressure buildup within this bore. In other words, the resistance to flow into the bore 18 of the orifice sleeve 16 increases simultaneously with the decrease in resistance to flow out of the orifice sleeve 16 so very small movement of the plunger 26 will produce a substantial drop in the pressure of the liquid within the orifice sleeve 16. At the same time, the resistance to flow into the orifice sleeve 14 is decreased while the resistance to flow out of this sleeve increased so a small movement of the plunger will cause a rapid buildup of the pressure within the bore 18 of the orifice sleeve 14.

The power valve 12 includes a free floating spool 31 positioned for axial movement with the power valve bore 32. The spool 31 is provided with end lands 33 and 34 which closely fit the bore 32 and in co-operation therewith define end chambers 36 and 37 respectively. The end chamber 36 is connected to the bore 18 of the orifice sleeve 16 through a passage 38 and the end chamber 37 is connected to the bore 18 of the orifice sleeve 14 through a passage 39. Therefore, a shift to the right of the pilot valve plunger 26 produces a decrease in the pressure within the orifice sleeve 16 which is transmitted to the end chamber 36 and an increase in the pressure within the orifice sleeve 14 which is transmitted to the end chamber 37. Such a pressure differential between the two orifice sleeves 14 and 16 will produce movement of the spool 31 to the left from the neutral position. Conversely, if the pilot valve plunger 26 moves to the left from the neutral position, the hydraulic connection produces an increase in pressure in the end chamber 36 and a decrease in pressure within the end chamber 37 which causes the spool 31 to move to the right.

The spool 31 is formed with conventional spaced control lands 41 and 42 which are positioned to close controlled passages 43 and 44 when the spool is in the neutral position. When the spool 31 shifts to the right, the controlled passage 44 is brought into communication with the inlet passage 13 and the controlled passage 43 is brought into communication with the reservoir return passage 22. Conversely, when the spool 31 is shifted to the left, the opposite connections are made. In normal operations, the spool 31 shifts only a small amount to provide metered flow into or out of the controlled passages 43 and 44, as the case may be, and does not move to a fully open position in either direction.

The torque motor 10 is provided with an armature 46 mounted on a pivot 47 for rotation under the influence of magnetic fields produced by electrical coils 48 and 49. If one polarity of signal is applied to the coils 48 and 49 through their lead wires, schematically shown by the dotted lines 51 and 52 respectively, the armature 46 pivots in a clockwise direction. Conversely, if the opposite polarity is applied to the coils 48 and 49, the armature 46 pivots in a counterclockwise direction. The end of the pilot valve plunger 26 is connected at 53 to the armature so that pivotal movement of the armature 46 moves the plunger 26 either to the right or the left depending upon direction of pivotal movement of the armature 46. The torque motor 10 is designed so that magnetic saturation is not reached in normal operation so the torque applied to the armature 46 is directly proportional to the signal strength and polarity.

In order to neutralize the armature 46 when the desired amount of differential pressure exists between the two controlled passages 43 and 44, a pair of similar pressure sensing devices are provided. A first pressure sensor 54 includes a piston 56 which engages the armature 46 below the pivot 47 and a second pressure sensor 57 includes a piston 58 engaging the armature 46 above the pivot 47. The engagement between the two pistons 56 and 58 and the armature 46 are equally spaced from the pivot 47 so the system is symmetrical. The first pressure sensor 54 is connected to the controlled passage 43 by a cross passage 59 and the second pressure sensor 57 is connected to the controlled passage 44 by a cross passage 61. Therefore, when the pressure in the controlled passage 43 is higher than the pressure in the controlled passage 44, the piston 56 produces a larger force on the armature 46 than the piston 58. Therefore, the two sensors co-operate to produce a counterclosckwise torque on the armature 46 which overcomes the magnetic torque applied by the signal current in the coils 48 and 49 to return the armature 46 to the neutral position when the two torques balance. Light springs 60 can be provided in each of the pressure sensors 54 and 57 to bias the pistons 56 and 58 toward the armature 46 and maintain the armature 46 in the neutral position when the valve is not operating. These springs are light so that their action does not materially affect the operation of the device.

The controlled passages 43 and 44 are connected to any suitable hydraulic devices such as the piston and cylinder actuator 62. In this type of an actuator, the controlled passages 43 and 44 are connected to the ends of the actuator 62 as shown by the dotted line 63 in FIGURE 1.

Figure 2:
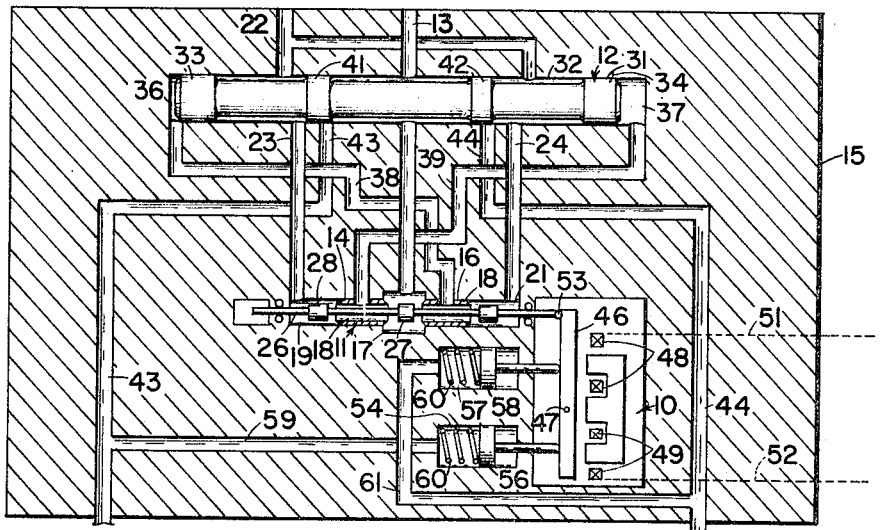
FIGURE 2 is a view similar to FIGURE 1 showing the element positions when a control signal is applied.

In operation, if a signal applied to the coils 48 and 49 produces clockwise torque and in turn rotation in the armature 46, this moves the pilot valve plunger 26 to the right and results in an increase in the pressure in the power valve end chamber 37 and a decrease in the pressure of the power valve end chamber 36. The difference in pressures shifts the power valve spool 31 to the left opening the controlled passage 43 for communication with the inlet 13 and the controlled passage 44 for communication with the reservoir return 22. This produces an increase of pressure in the controlled passage 43 and a decrease in pressure in the controlled passage 44 and in turn results in a higher force to the right on a piston 56 and a decrease in the force of the piston 58 resulting in a counterclockwise torque on the armature 46. When the counterclockwise torque produced by the pressure sensors 54 and 57 equals the magnetic torque on the armature 46, the armature returns to the neutral position. This in turn causes an equalization of the pressure in the two end chambers 36 and 37 which in turn stops the spool 31 from moving to the left. The spool, therefore, remains in a displaced position wherein the displacement is a function of the applied signal, and the plunger remains in the neutral position. This is the condition shown in FIGURE 2.

If the spool 31 has moved too far to the left for a given signal, the pressure sensors will overcome the magnetic torque and move the plunger 26 to the left which will in turn cause movement of the spool 31 to the right. When the proper position of the spool 31 is achieved, the magnetic torque is exactly balanced by the opposite torque produced by the pressure sensors 54 and 57. Therefore, the pressure differential between the two controlled passages 43 and 44 is a direct function of the magnetic torque produced by the electrical signal applied to the valve. The desired relationship between the differential pressure and the electric control signal is always maintained by this structure regardless of any wear or dirt deposits in the pilot valve so the device is very dependable in operation. Because very slight movements of the plunger 26 will produce rapid changes in the pressure of the first stage, a rapid response valve is provided. Also, since the plunger 26 is completely symmetrical, it is balanced and the hydraulic forces do not affect the operation of the system. Therefore, variations in the inlet pressure do not affect the operation of the device. Additional accuracy is also provided due to the fact that the torque motor is in the neutral position whenever the desired differential pressure is reached due to the blancing operation of the pressure sensors. Since the armature is always in the neutral position when regulation is reached, the torque produced by the motor will be an exact function of the applied signal and is not affected by displacement of the armature from neutral, a condition normally present in other type servo valves.

Figure 4:
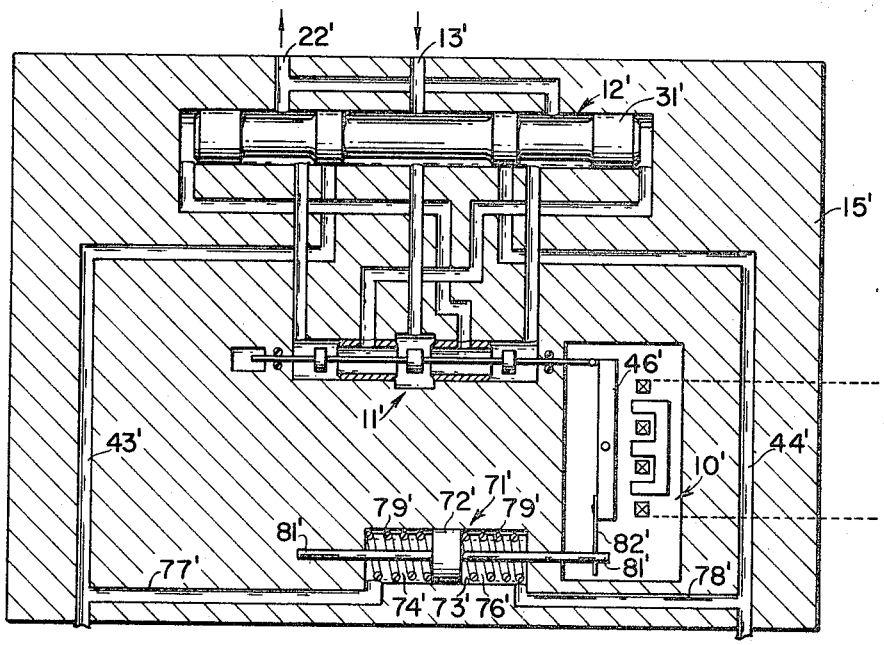
FIGURE 4 is a schematic view of a second embodiment of a valve incorporating this invention.

In the embodiment illustrated in FIGURE 4, a single sensing unit is utilized to balance the torque motor. In this embodiment, similar reference numerals will be used when they refer to elements corresponding to similar elements in the first embodiment but a prime (') will be added to indicate that it is a second embodiment.

A power valve 12' is located in the body 15' and operates to selectively connect the controlled passages 43' and 44' to the inlet passage 13' and the reservoir return 22'. The pilot valve 11' operates to control the power valve 12' and is in turn operated by a torque motor 10'. In this embodiment, however, a single pressure sensor 71' is connected to the torque motor armature 46'. The sensor 71' includes a piston 72' located in a cylinder bore 73' which divides the cylinder bore into a first chamber 74' and a second chamber 76'. The first chamber 74' is connected to the controlled passage 43' by a passage 77' and the second chamber 76' is connected to the controlled passage 44' by a passage 78'. A pair of opposed centering springs 79' engage opposite sides of the piston 72' and urge it toward the neutral position shown in FIGURE 4. The piston 72' is provided with a piston rod 81' which extends with equal area from both sides of the piston 72' so that the piston 72' has equal areas on both of its sides. The piston rod 81' is connected to a leaf type spring 82' which extends from one end of the armature 46'.

Figure 5:
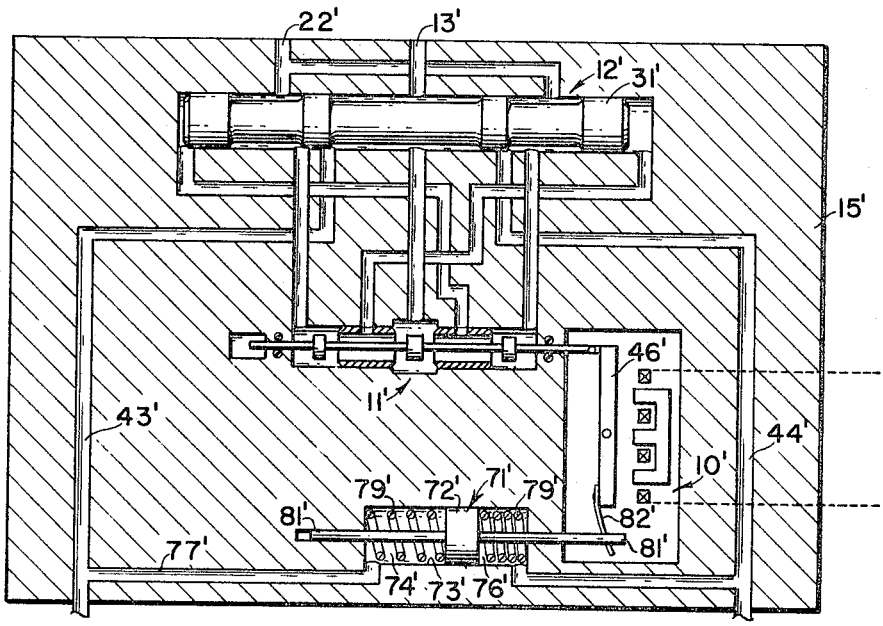
FIGURE 5 is a view of the second embodiment in an operated position.

In operation, when a signal is applied to the torque motor 10' to rotate the armature 46' in a clockwise direction, the leaf spring 82' is deflected without moving the piston 72'. The clockwise rotation of the armature 46 shifts the pilot valve 11' to the right and operates to shift the spool 31' to the left. This spool movement connects the inlet passage 13' to the controlled passage 43' and the reservoir return 22' to the controlled passage 44'. The pressure in the controlled passage 43' therefore increases to a value higher than the pressure in the controlled passage 44' so a differential pressure is applied across the piston 72'. The differential pressure causes the piston 72' to shift against the action of the centering springs 79' to a position displaced to the right. The amount of displacement is a function of the differential pressure and the spring rate of the centering springs 79' so that the displacement of the piston 72' will have a direct relationship to the differential pressure produced in the two controlled passages 43' and 44'. Movement of the piston 72' to the right operates to apply a torque to the leaf spring 72' which returns the armature 46' to the neutral position as shown in FIGURE 5. If an opposite signal is applied to the torque motor, the opposite action occurs and the pressure sensor 71' operates to return the armature 46' to the neutral position by pulling on the leaf spring balancing the electrically induced force of the torque motor. This embodiment has the advantage of being adaptable for use at higher pressures since the centering springs 79' operate to balance the differential pressure and the light leaf spring 82' supplies the light torque for balancing the electrically induced force on the armature 46'. Also, the torque motor, when it initially rotates to operate the pilot valve, does not have to overcome friction to move the plungers but merely produces deflection in the leaf spring 82' so a more sensitive unit is provided.

Although preferred embodiments of this invention are illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description is determinative of the scope of the invention.

We claim:

An electric hydraulic valve comprising a valve body formed with a valve bore, inlet and return ports open to said bore, two controlled ports open to said bore, a spool slidable in said bore controlling fluid flow through said ports, said body and spool cooperating to define a chamber at each end of such spool, a pilot valve plunger connected to said chambers and said inlet and return ports operable to change the pressures in said chambers and shift said spool, an electric torque motor including an armature having first and second operative ends and a central electro-responsive portion, said armature pivoted at said central portion for movement from a neutral position in response to electrical signals and pivotally connected at said first end to operate said pilot valve plunger upon such movement, a pressure responsive output device in fluid communication with said controlled ports, and a resilient connection between said output device and said second end of said armature, said output device being operable in response to differences in pressures between said controlled ports to vary the position of said armature and to return said armature to said neutral position when moved therefrom in response to an electrical signal applied to the torque motor.

References Cited by the Examiner

UNITED STATES PATENTS

| | | |
|---|---|---|
| 2,045,579 | 6/1936 | Carlson. |
| 2,104,627 | 1/1938 | Von Manteuffel. |
| 2,188,834 | 1/1940 | Fischel et al. |
| 2,790,427 | 4/1957 | Carson. |
| 2,860,606 | 11/1958 | Ainsworth _____ 121—46.5 |
| 2,909,195 | 10/1959 | Keyt _____ 137—623 |
| 2,912,010 | 11/1959 | Evens et al. _____ 137—623 |
| 2,931,389 | 4/1960 | Moog et al. _____ 137—623 |
| 2,939,430 | 6/1960 | Westbury _____ 137—623 |
| 2,954,794 | 10/1960 | Paine _____ 137—85 X |
| 3,044,480 | 7/1962 | Lee _____ 137—625.62 X |
| 3,101,650 | 8/1962 | Blanton _____ 137—625.62 X |

ALAN COHAN, *Primary Examiner.*

K. ALBRECHT, R. H. BRAUNER, WILLIAM F. O'DEA, E. W. DOWNS, E. T. REICHERT, R. G. NILSON, *Assistant Examiners.*